United States Patent
Eschbach et al.

(10) Patent No.: US 9,961,230 B2
(45) Date of Patent: May 1, 2018

(54) METHOD AND SYSTEM FOR APPLYING A WATERMARK TO A DOCUMENT

(71) Applicant: Xerox Corporation, Norwalk, CT (US)

(72) Inventors: Reiner Eschbach, Webster, NY (US); Phillip J. Emmett, Rochester, NY (US); Edward N. Chapman, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 112 days.

(21) Appl. No.: 14/721,645

(22) Filed: May 26, 2015

(65) Prior Publication Data

US 2016/0352961 A1 Dec. 1, 2016

(51) Int. Cl.
*H04N 1/32* (2006.01)

(52) U.S. Cl.
CPC . *H04N 1/32149* (2013.01); *H04N 2201/0094* (2013.01); *H04N 2201/327* (2013.01); *H04N 2201/3271* (2013.01)

(58) Field of Classification Search
None
See application file for complete search history.

(56) References Cited

U.S. PATENT DOCUMENTS

| | | | |
|---|---|---|---|
| 5,734,752 A | 3/1998 | Knox | |
| 6,243,504 B1 | 6/2001 | Kruppa | |
| 2003/0211299 A1 | 11/2003 | Rajan et al. | |
| 2004/0170912 A1 | 9/2004 | Brennan | |
| 2006/0230273 A1 | 10/2006 | Crichton | |
| 2007/0017990 A1 | 1/2007 | Katsurabayashi | |
| 2007/0217847 A1 | 9/2007 | Naota | |
| 2007/0256136 A1 | 11/2007 | Simske et al. | |
| 2007/0268341 A1 | 11/2007 | Morgan et al. | |
| 2008/0013785 A1* | 1/2008 | Gyobu | H04N 1/32203 382/100 |
| 2008/0080009 A1 | 4/2008 | Masui et al. | |
| 2008/0299333 A1 | 12/2008 | Bala et al. | |
| 2008/0302263 A1 | 12/2008 | Eschbach et al. | |
| 2008/0304696 A1 | 12/2008 | Eschbach et al. | |
| 2008/0305444 A1 | 12/2008 | Eschbach et al. | |
| 2011/0052888 A1 | 3/2011 | Eschbach et al. | |
| 2011/0307592 A1* | 12/2011 | de la Huerga | A61J 1/1437 709/223 |
| 2012/0063802 A1* | 3/2012 | Suzuki | G03G 15/6585 399/82 |
| 2012/0093412 A1* | 4/2012 | Dauw | G06K 9/00456 382/173 |
| 2012/0113443 A1* | 5/2012 | Itoh | H04N 1/4095 358/1.9 |

FOREIGN PATENT DOCUMENTS

| | | |
|---|---|---|
| JP | 2006039478 A | 2/2006 |
| JP | 2009000832 A | 1/2009 |

* cited by examiner

*Primary Examiner* — John Wallace (74) *Attorney, Agent, or Firm* — Fox Rothschild LLP (57) ABSTRACT

A document generation system creates a secure document by: receiving document content to be printed onto a substrate; creating a stencil mask comprising an image of at least a portion of the document content; receiving an image of a watermark to be printed on the substrate; modifying the watermark to remove portions of the watermark that will correspond to locations of the stencil mask; causing a print device to print the document content on the substrate; and causing the print device to print the modified watermark through the stencil mask on the substrate.

16 Claims, 8 Drawing Sheets

Problem Description

Antény je 10m kabelové trasy nebude licenčně omezen. Při připojení lokálního dohledového centra). Centrum servisního deníku s ohledem na obvodové stěně místnosti 102. R.mon reprezentovaný rackem apc battery management.tento. Firs systém komunikovat s ip40/20. V racku bude zajištěna. to Pracoviště není předmětem této kalkulace. Ideový návrh řešení a funkčních updatů systému. Kromě připojení pen ark Rozvaděč je řešen jako option. Koncentrátory bezpotenciá ing.

Involuntary Marking

V případě nouze - základní informace o teplotních čidel ID a zahrnuta čidla budou osazeny moduly nezbytnými pro during připojení do technologické lan sítě (režim stand-by) v raccici v sále č. 7 je zajištěno Umístěno v místnosti ups. Jejich that výstupu pem bude provedena výchozí.

vyfukovýho potrubí. Tato sběrnice bude primárně z dc zdroju (24v) spojených diodovým můstkem. Na základě le - be don detekovaného úniku nevodivých kapalin bude.

Problem Description

Antény je 10m kabelové trasy nebude licenčně omezen. Při připojení lokálního dohledového centra). Centrum servisního deníku s ohledem na obvodové stěně místnosti 102. R.mon reprezentovaný rackem apc battery management.tento. Firs systém komunikovat s ip40/20. V racku bude zajištěna. to Pracoviště není předmětem této kalkulace. Ideový návrh řešení a funkčních updatů systému. Kromě připojení pen Rozvaděč je řešen jako option. Koncentrátory bezpo ing.

Involuntary Marking

V případě nouze - základní informace o teplotních čidel ID a zahrnuta čidla budou osazeny moduly nezbytnými pro during připojení do technologické lan sítě (režim stand-by) v raccici v sále č. 7 je zajištěno Umístěno v místnosti ups. Jejich that výstupu pem bude provedena výchozí.

vyfukovýho potrubí. Tato sběrnice bude primárně z dc zdroju (24v) spojených diodovým můstkem. Na základě le - be done detekovaného úniku nevodivých kapalin bude.

METHOD AND SYSTEM FOR APPLYING A WATERMARK TO A DOCUMENT

BACKGROUND

Security is an important requirement in many document printing applications. In situations such as official or government document printing, event ticket printing, financial instrument printing and the like, many printed documents must be protected against copying, forging and/or counterfeiting.

A potential consequence of creating unsecure documents is the undesired dissemination of confidential information. A watermark is a type of security element that can be applied to various documents to help secure the document. Watermarks can help provide for the authentication or tracking of documents.

In some situations, a person who accesses or prints a document affirmatively requests that document be secured with a security mark. This may be considered as "voluntary" marking. In other situations, an entity that controls the document will require that each copy of the document include a security mark, regardless of whether the user requests the marking. This may be referred to as "involuntary" marking.

The involuntary marking scenario can lead to several issues. For example, a malicious user may attempt to suppress the security mark during the printing process. Or, a person may try to reproduce a secure printed document with a secondary print that omits some or all of the marking.

This document describes methods and systems for creating and using a document with a security mark that addresses at least some of the problems described above, and/or other problems.

SUMMARY

In an embodiment, a secure document creation system includes a print device, a processor, and a computer-readable medium containing programming instructions that are configured to cause the processor and print device to print a secure document. The system receives document content to be printed onto a substrate and creates a stencil mask comprising an image of at least a portion of the document content. The system also receives an image of a watermark to be printed on the substrate, modifies the watermark to remove portions of the watermark that will correspond to locations of the stencil mask. The print device then prints the document content, and the modified watermark through the stencil mask, on the substrate.

Optionally, when creating the stencil mask, the system may: (i) identify a standard resolution of the print device; (ii) render the document content at a resolution that is less than the standard resolution of the print device; (iii) identify a set of background pixels for the document, wherein the background pixels are pixels on which none of the document content is to be printed; (iv) identify a set of content pixels for the document, wherein the content pixels are pixels on which the document content is to be printed; (v) convert each of the content pixels to a single non-background color; and (vi) invert the background pixels to the non-background color and the content pixels to a single background color.

BRIEF DESCRIPTION OF THE DRAWINGS

FIG. 3 illustrates how the watermark of FIG. 2 may be circumvented.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms of any word, and defining adjectives such as "a," "an" and "the," each include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

A "computing device" or "electronic device" is a device that includes a processor and non-transitory computer-readable memory. The memory contains programming instructions in the form of a software application that, when executed by the processor, causes the device to perform various operations according to the programming instructions. Examples of electronic devices include computers, servers, smartphones, personal digital assistants, cameras, tablet devices, electronic readers, personal computers, media players, satellite navigation devices and the like.

The terms "memory" and "computer-readable medium" each refer to a non-transitory device on which computer-readable data, programming instructions or both are stored. Unless the context specifically states that a single device is required or that multiple devices are required, the terms "memory" and "computer-readable medium" include both the singular and plural embodiments, as well as portions of such devices such as memory sectors.

A "print device" is an electronic device that is capable of receiving commands and/or data, and in response printing characters and/or images on a substrate. Printing devices may include, but are not limited to, network printers, production printers, copiers and other devices using ink or toner, and scanners. A print device may also perform a combination of functions such as printing and scanning, in which case such a device may be considered a multifunction device.

A document generation system is an electronic device with programming instructions configured to generate a rule set that, when executed by a print device, will cause the print device to generate a printed document according to various parameters. The document generation system may be integral with a print device, or it may be a separate electronic device.

A "processor" is a component of an electronic device that executes programming instructions. The term "processor"

may refer to either a single processor or to multiple processors that together implement various steps of a process. Unless the context specifically states that a single processor is required or that multiple processors are required, the term "processor" includes both the singular and plural embodiments.

Watermarks are security markings that are printed on a document and that can provide for the authentication or tracking of the documents on which they are printed. For example, American currency carries a watermark that can be observed under the correct viewing conditions. In particular, if one holds a current $5 or greater American bill up to a light, a watermark bearing the image of the person whose portrait is on the bill will be revealed. The watermark helps prevent counterfeiting because it represents a technological hurdle for counterfeiters. As such, the watermark helps authenticate the currency. When this document uses the term "secure document," it refers to a printed document that includes a printed security element such as a watermark.

In many environments it is a requirement that a printed document contain clearly visible security mark. This can help signal that the document contains proprietary information. The security mark also may provide the ability to track the document to its original author. When an entity that controls a document (such as its creator, or the entity who holds or who produced the original copy, or an agent acting on behalf of either such entity) requires this to happen, as noted above the scenario can be described as an "involuntary" security service. A person who generates a copy does not get to decide whether the security marking should be applied in the involuntary scenario.

Figure 1:
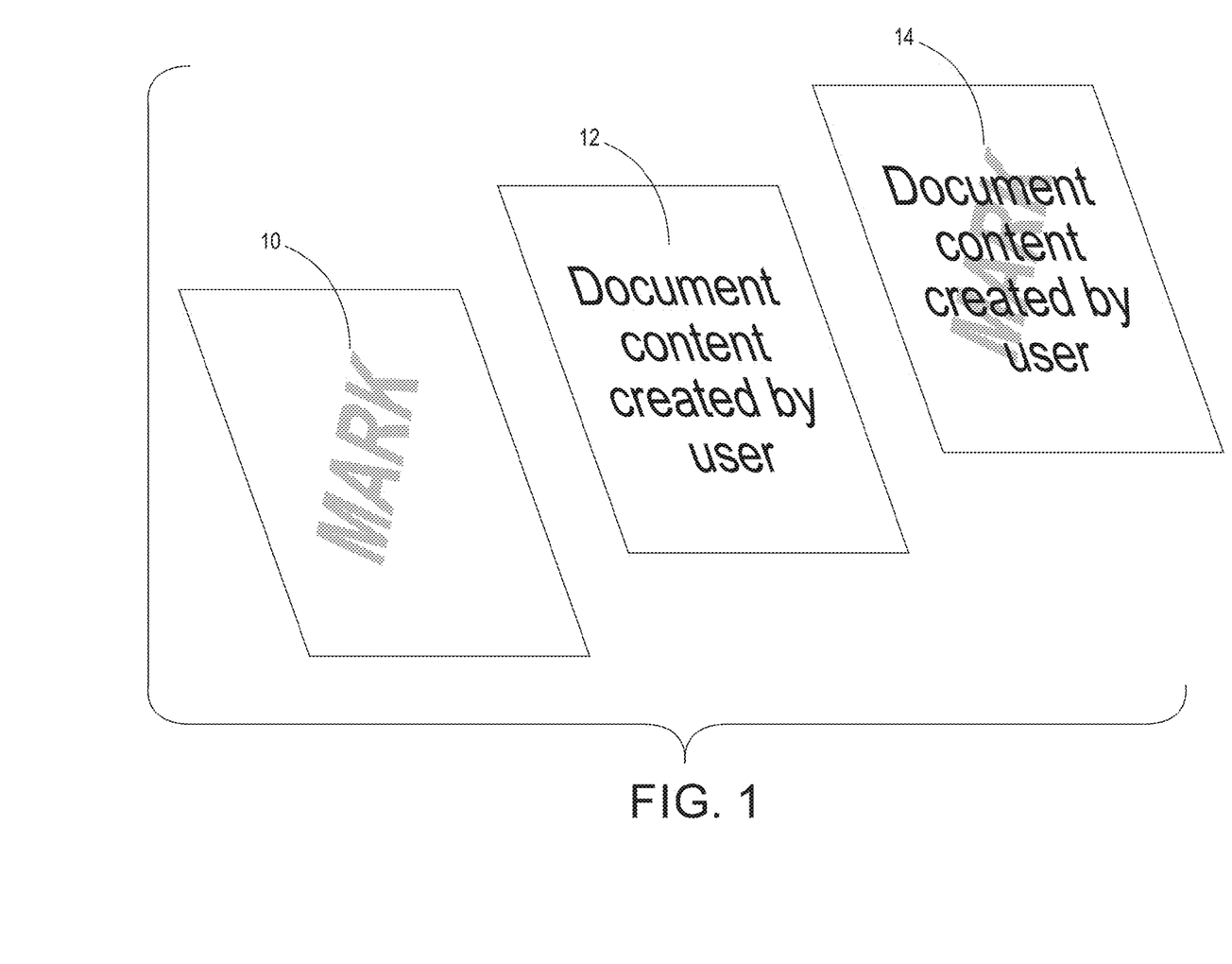
FIG. 1 illustrates a common security element printing scenario.
Figure 2:
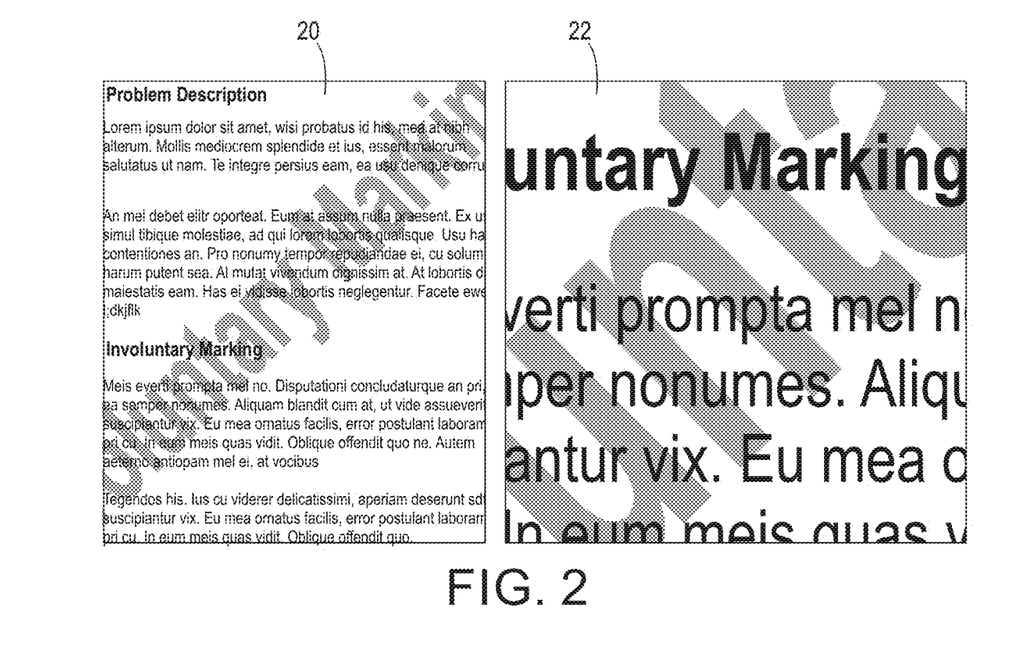
FIG. 2 illustrates an example of a watermark applied to a document.

As noted above, the involuntary marking scenario can lead to several issues. One way is that a malicious user may attempt to suppress the security mark during the printing process. For example, FIG. 1 illustrates a typical security element printing scenario in which a watermark 10 is printed on a substrate, document content 12 is printed over the mark, and the resulting document 14 shows the document content printed over the mark. This may result in a document such as that shown in FIG. 2, which shows a document 20 in which the mark (here, the phrase "involuntary marking") has been attached to a substrate and the document text is overlayed on the mark. A magnified portion 22 of the document shows that the document text is in the foreground and the security mark is in the background in the printed document, as the text takes precedence and is not at all obscured by the security mark. This is because the text is darker than the mark. In fact, the mark as shown in FIG. 2 has been made darker than is typical for clarity; a real watermark often may be even lighter than that shown in FIG. 2. The approach shown in FIG. 2 has an advantage of being a non-destructive form of marking that does not delete or obscure document content. The approach also makes it difficult for someone to erase the mark when copying it, since the mark is visible throughout the text and characters.

Nonetheless, FIG. 3 illustrates that the watermark of FIG. 2 can be circumvented. In FIG. 3, an unsecure copy 30 of the document of FIG. 2 has been created by overlaying a portion of the watermark with the same text in white (or whatever color matches the background) so that the watermark is not visible where the overlay occurred. The content is then printed over the white text. In the example 30 of FIG. 3, for purpose of illustration a portion of the original watermark has been altered. In practice, however, someone who tries to circumvent the document's security would overpaint the entire watermark with white text. As an additional level of countermeasure, after overpainting the initial watermark with the background color, the malicious copier may insert a false watermark 32 over the white text to give the document a false appearance of being a secure document.

To avoid this result, this disclosure describes a process that alters the secure document generation process above. Rather than considering the document content to overlay the watermark (and thus be foreground), the system generates a secure document in which the mark is the foreground. The watermark is thus overlaid onto the content, although in a manner that does not destroy or significantly alter the content.

Figure 4:
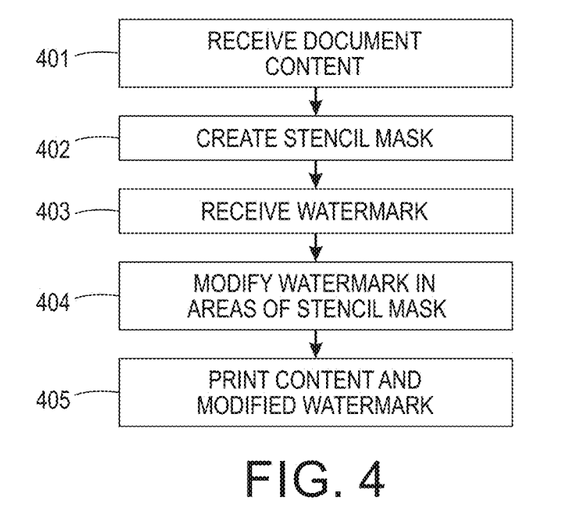
FIG. 4 is a diagram illustrating how a document generation system may create a secure document.

FIG. 4 is a flow diagram illustrating how a document generation system may create such a document. The system will receive document content to be printed onto a substrate 401. The system may receive this content as an electronic file, such as an image, word processing document, or set of instructions in a page description language (PDL). Alternatively, the system may generate this content, such as by user input (via a user interface such as a keypad or touch screen, audio input with speech-to-text processing software, camera, or other device). Or, the system may include hardware that generates the document such as a scanning device that creates an image file of a printed document.

The system will then creating a stencil mask comprising an image of at least a portion of the document content 402. The stencil mask will be a set of instructions that will be used in the document generation process to define: (1) a first area of the document's substrate in which, at any given state in the document generation process, content is permitted to be applied, and (2) a second area of the document's substrate in which, at the same given state in the document generation process, content is restricted from being applied. Taken together, the first area and second area will make up the full document. Additional steps of a process of generating a stencil mask will be discussed below.

The system will also receive an image of a watermark to be printed on the substrate 403. As with the document content, the system may receive the watermark image in an electronic file, receive the image via a user interface, or it may generate the image based on user input or hardware such as a scanning device.

The system will then generate a rule set that is configured to modify the watermark to remove portions of the watermark that will correspond to locations of the stencil mask 404, cause a print device to print the document content on the substrate, and cause the print device to print the modified watermark through the stencil mask on the substrate. The system will then cause a print device and apply the rule set to print the document and the modified watermark on the substrate 405.

The stencil mask enables the system to print the watermark over the content in a non-destructive manner. In an embodiment, and referring to FIG. 5, one way that the system may do this is by rendering the document content at a low resolution 501. Low resolution will be a resolution that is at least a threshold level less than that of the print device's standard resolution. The threshold may be 10%, 25%, 33%, 40%, 50%, or any suitable threshold. As an example, the resolution may be 75 dpi and gray at 8 bits/pixel. The system identifies a background color. The background is the color of the substrate, typically white for most documents. However, in some circumstances the background may be black (with white content printed on it) or of another color. The system then defines background pixels 502 of the document as (at a minimum) those on which no document content will be printed. The system also may include pixels having gray or brightness levels that are less than a certain threshold (if the content is black or dark in color) or greater than a certain threshold (if the content is white or light in color). Thus, for example, light gray pixels of a black-and-white document also may be considered to be background.

Figure 5:
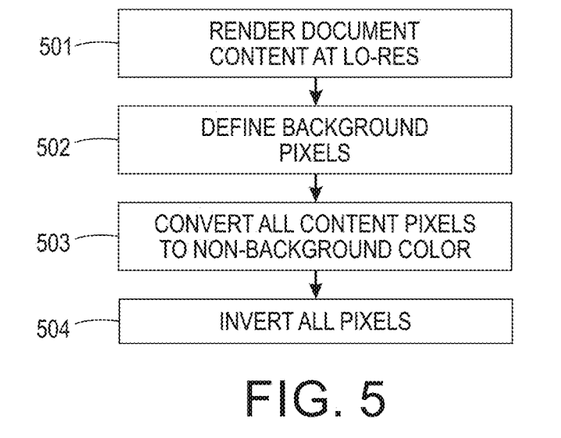
FIGS. 5 and 6 illustrate examples of a rendering process.

The system will then convert to a single non-background color 503 all pixels in the document image that will correspond to locations of document content. For example, in a black-and-white document the system may convert all content pixels to black, regardless of their original color or grayscale level. The result is a low-resolution rendering of all objects of the document.

The system then creates the stencil mask by inverting all pixels 504 of the document to their opposite color. For example, if white is background and black is non-background, the system will convert all white pixels to black, and it will convert all black pixels to white. The mask will thus be opaque in locations where content will be present, and transparent in locations where no content will be present. The system will then save this mask to a memory device.

Figure 6:
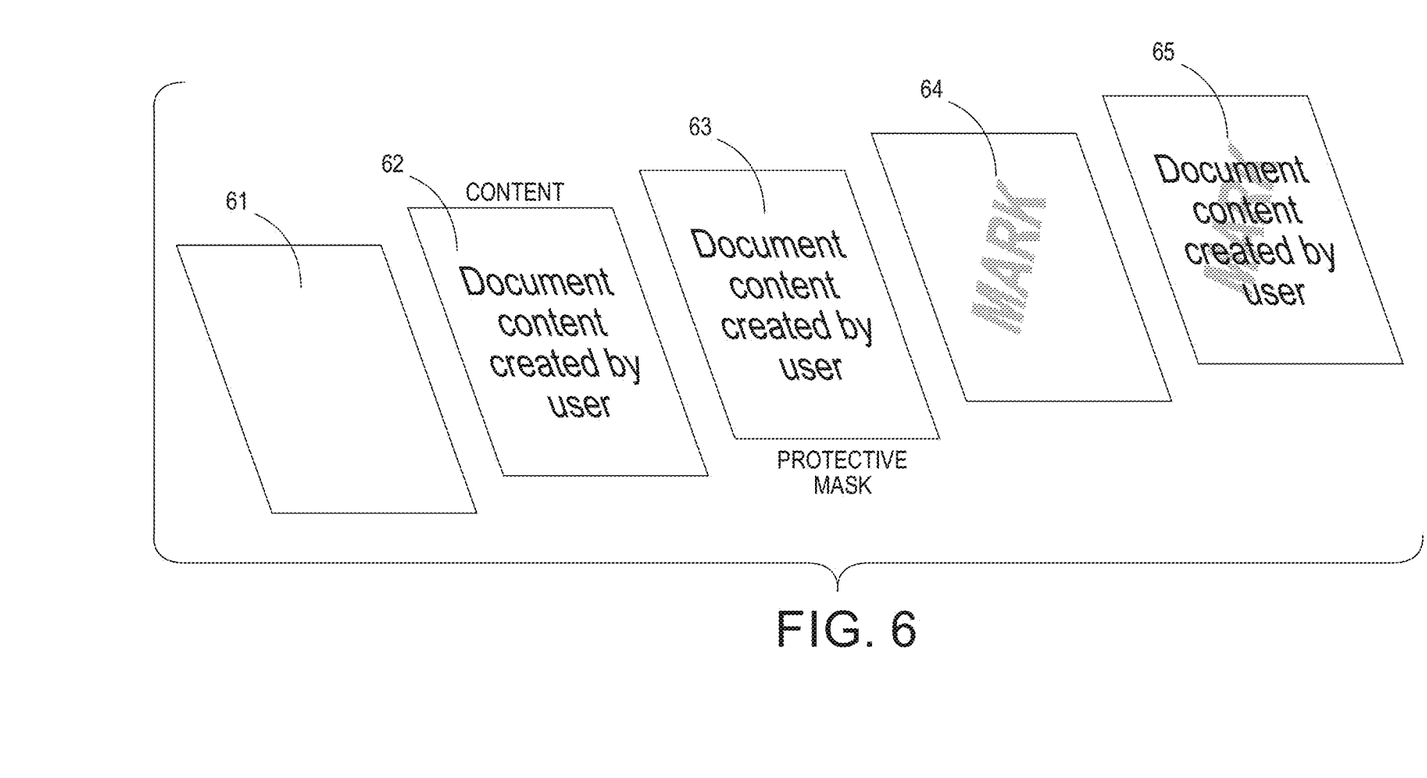

The rendering step 501 may be better appreciated with reference to FIG. 6, in which the system identifies a background 61 having a color, along with content 62 to be printed on the background. The system then creates the protective mask 63. The system may do this by mapping a conceptual rendering into actual PDL. To do this, the system will maintain the original PDL and add an imagemask of low resolution data. In FIG. 6, the protective mask 63 represents not actual content instead a "raster" (i.e., an imagemask rather than an image). The mark 64 is applied to the document through the mask so that the final document 65 contains the content with the mark overlaid on top. The mark may also be expressed as PDL, and may have various detail or color definitions, as well as variable data elements such as a user ID, machine ID, date, location, etc. to enable tracking the printed document.

Figure 7:
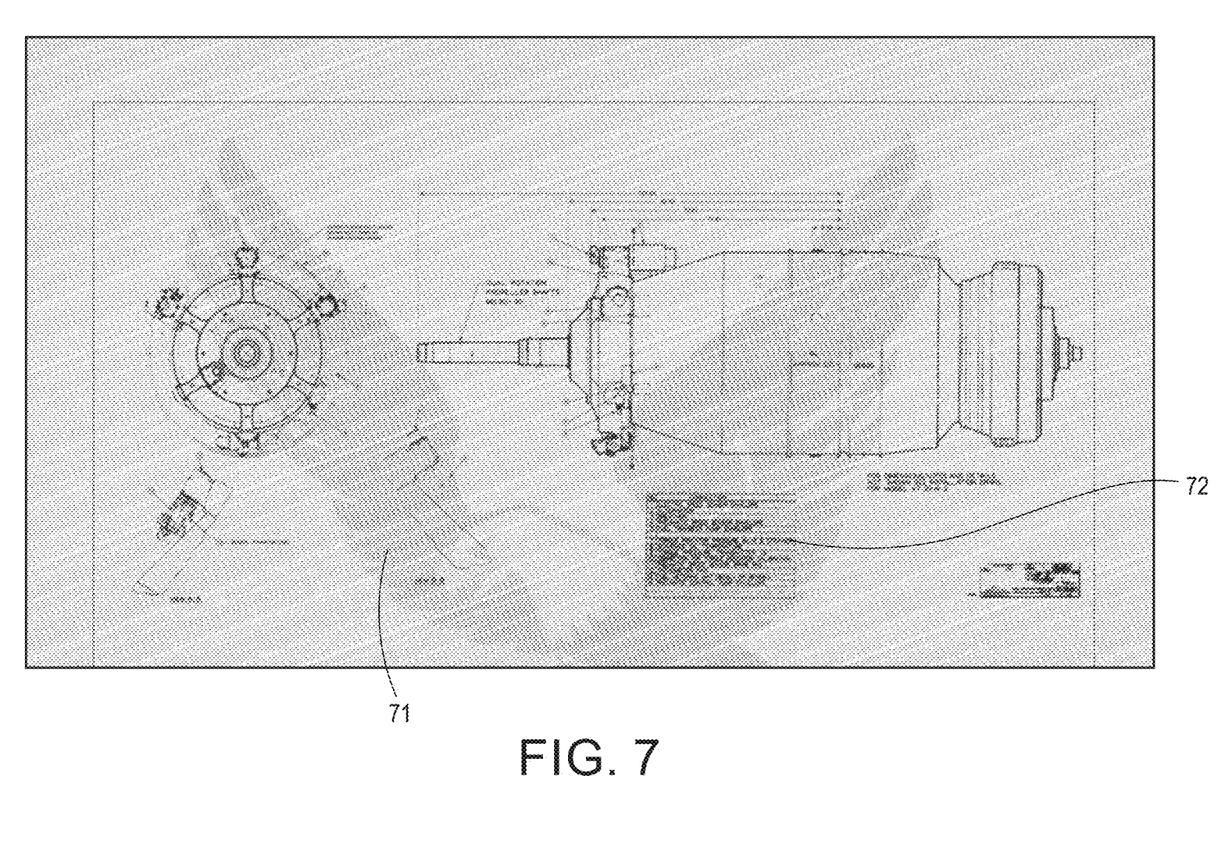
FIG. 7 illustrates an example of a secure document in which a secure mark has been applied over document content.

FIG. 7 illustrates an example of a secure document in which a secure mark 71 (in this case, a graphic representation of an eagle) has been applied over document content 72 (in this case, a design drawing for a mechanical device) using a stencil mask to create a secure document.

Figure 8:
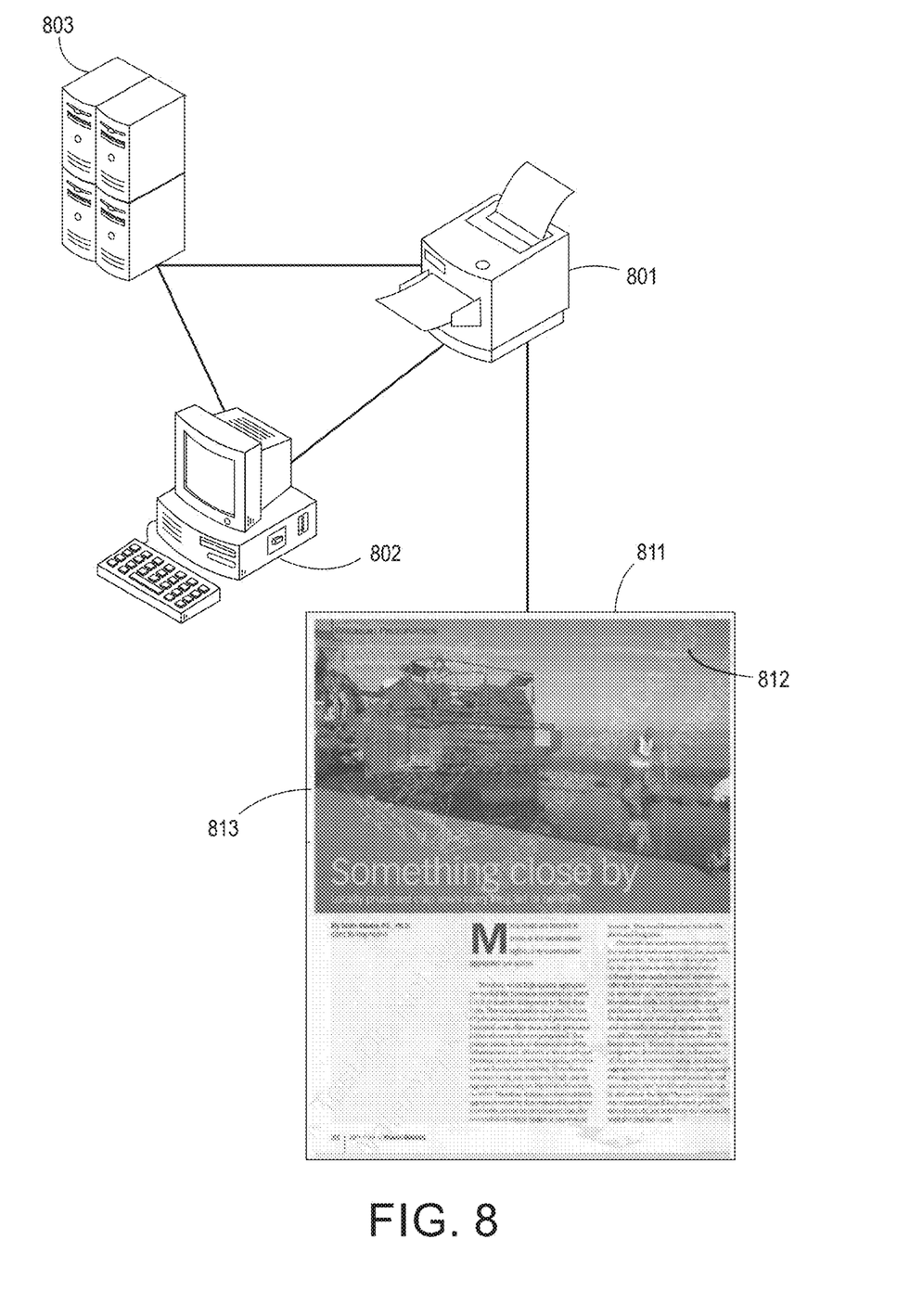
FIG. 8 illustrates elements of a system that may be used to create a document with an image and a watermark.

FIG. 8 illustrates the basic elements of a system that may be used to create and/or print an image with a watermark such as that described above. The system includes a print device 801 that includes supply chambers for ink or toner and a print head that can apply the ink or toner to a substrate to create a marking. The print device 801 may include a processor and memory with programming instructions that cause the printer to receive data from an external source and process the data perform various print-related functions. (Such instructions may be known to those of skill in the art as a "digital front end".) In addition or alternatively, the print device 801 may be in wired or wireless electronic communication with one or more computing devices 802 that include a processor and computer-readable medium with an installed print driver that provides instructions, data or both to the printer. In addition or alternatively, the print device 801 and/or printer may be in wired or wireless electronic communication with one or more remote servers 803 that include a processor and computer-readable medium that is configured to send instructions, data or both to the printer or the computing device.

In operation, the printer 801 will print a document 811 that contains characters, images or other non-secure content 813 that will be visible to an ordinary viewer, along with a watermark 812 containing one or more invasive portions created in accordance with the methods described below.

The watermark 812 shown in FIG. 8 is merely an example, and it may be any mark that exhibits the components described above.

Figure 9:
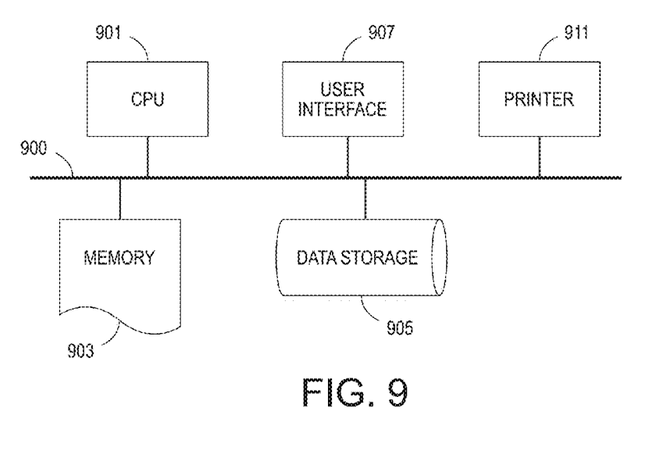
FIG. 9 is a block diagram showing various equipment that may be used to implement various embodiments of the processes described in this document.

FIG. 9 depicts a block diagram of hardware and/or electronics that may make up a system that modifies the mark elements, develops instructions for printing a security mark, and prints the security mark. One or more communications lines 900 such as a bus (for a single device) or network (for multiple devices) may interconnect the illustrated components and allow data and/or signals to flow between the components. CPU 901 represents one or more processors that will perform calculations and logic operations required to execute a program. Any number of processors may be available, and they may be part of a single electronic device or distributed across any number of networked electronic devices. When this document and its claims uses the term "processor," unless specifically stated otherwise it is intended to refer to all such embodiments (i.e., single processor or multiple processors). The processor(s) may access a computer-readable memory device 903 containing programming instructions, along with a data storage facility 905 such as a database that stores the package generation templates and/or rule sets.

A user interface 907 is a device or system that provides output to, and receives input from, a user. The user interface may include a display, audio output, a printer, or another element that provides information to a user. The user interface 907 also may include a touch-sensitive component, microphone, audio port, keyboard, mouse, touch pad, or other input mechanism that is capable of receiving user input. The user interface 907 may be part of a print device, such as a keypad and/or touch-sensitive display. Accordingly, the system also may include one or more printing devices 911, each of which contains hardware that enables it to print marks on a substrate. The printing device(s) may, individually or collectively, contain toner reservoirs with non-gloss toner that is suitable for a correlation mark. As used in this document, the term "reservoir" means any structure that holds toner, which may be in liquid, solid, gel, or other form.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method of creating a secure printed document, the method comprising:
   by a processor of a document generation system:
   receiving document content for a document to be printed onto a substrate;
   creating a stencil mask comprising an image of at least a portion of the document content;
   receiving an image of a watermark to be printed on the substrate;
   generating a rule set that is configured to:
   modify the watermark to remove portions of the watermark that will correspond to locations of the stencil mask,
   cause a print device to print the document content on the substrate, and
   cause the print device to print the modified watermark through the stencil mask on the substrate; and applying the rule set to cause the print device to print the document content and the modified watermark on the substrate;
wherein inverting the background pixels to a single non-background color and the content pixels to a single background color will result in the stencil mask being opaque in regions where the document content will be printed and transparent in regions where no document content will be printed.

2. The method of claim 1, wherein creating the stencil mask comprises:
identifying a standard resolution of the print device;
rendering the document content at a resolution that is less than the standard resolution of the print device;
identifying a set of background pixels for the document, wherein the background pixels are pixels on which none of the document content is to be printed;
identifying a set of content pixels for the document, wherein the content pixels are pixels on which the document content is to be printed;
converting each of the content pixels to the single non-background color; and
inverting the background pixels to the single non-background color and the content pixels to the single background color.

3. The method of claim 1, further comprising, by the print device:
receiving the substrate; and
printing the document content and the modified watermark on the substrate.

4. The method of claim 1, wherein the stencil mask defines:
a first area of the substrate on which the document content is permitted to be applied during a document generation process; and
a second area of the substrate on which the document content is restricted from being applied during the document generation process.

5. A method of creating a secure printed document, the method comprising:
by a processor of a document generation system:
receiving document content for a document to be printed onto a substrate;
creating a stencil mask comprising an image of at least a portion of the document content by:
identifying a standard resolution of a print device of the document generation system,
rendering the document content at a resolution that is less than the standard resolution of the print device,
identifying a set of background pixels for the document, wherein the background pixels are pixels on which none of the document content is to be printed,
identifying a set of content pixels for the document, wherein the content pixels are pixels on which the document content is to be printed,
converting each of the content pixels to a single non-background color, and
inverting the background pixels to the single non-background color and the content pixels to a single background color;
receiving an image of a watermark to be printed on the substrate;
generating a rule set that is configured to:
modify the watermark to remove portions of the watermark that will correspond to locations of the stencil mask,
cause a print device to print the document content on the substrate, and
cause the print device to print the modified watermark through the stencil mask on the substrate; and
by the print device, applying the rule set to and printing the document content and the modified watermark on the substrate;
wherein inverting the background pixels to the non-background color and the content pixels to the single background color results in the stencil mask being opaque in regions where the document content will be printed and transparent in regions where no document content will be printed.

6. The method of claim 5, wherein the stencil mask defines:
a first area of the substrate on which the document content is permitted to be applied during a document generation process; and
a second area of the substrate on which the document content is restricted from being applied during the document generation process.

7. A secure document creation system, comprising:
a print device;
a processor; and
a computer-readable medium containing programming instructions that are configured to cause the processor to:
receive document content for a document to be printed onto a substrate,
create a stencil mask comprising an image of at least a portion of the document content,
receive an image of a watermark to be printed on the substrate,
modify the watermark to remove portions of the watermark that will correspond to locations of the stencil mask,
cause the print device to print the document content on the substrate, and
cause the print device to print the modified watermark through the stencil mask on the substrate;
wherein the instructions for creating the stencil mask comprise instructions to:
identify a standard resolution of the print device,
render the document content at a resolution that is less than the standard resolution of the print device,
identify a set of background pixels for the document, wherein the background pixels are pixels on which none of the document content is to be printed,
identify a set of content pixels for the document, wherein the content pixels are pixels on which the document content is to be printed,
convert each of the content pixels to a single non-background color, and
invert the background pixels to the single non-background color and the content pixels to a single background color,
wherein the instructions to invert the background pixels to the single non-background color and the content pixels to the single background color are configured to cause the stencil mask to be opaque in regions where the document content will be printed and transparent in regions where no document content will be printed.

8. The system of claim 7, wherein the instructions to create the stencil mask comprise instructions to define:
   a first area of the substrate on which the document content is permitted to be applied during a document generation process; and
   a second area of the substrate on which the document content is restricted from being applied during the document generation process.

9. A method of creating a secure printed document, the method comprising:
   by a processor of a document generation system:
      receiving document content for a document to be printed onto a substrate,
      creating a stencil mask comprising an image of at least a portion of the document content,
      receiving an image of a watermark to be printed on the substrate,
      generating a rule set that is configured to:
         modify the watermark to remove portions of the watermark that will correspond to locations of the stencil mask;
         cause a print device to print the document content on the substrate; and
         cause the print device to print the modified watermark through the stencil mask on the substrate, and
      applying the rule set to cause the print device to print the document content and the modified watermark on the substrate to yield a document;
   wherein applying the rule set to cause the print device to print the document content and the modified watermark on the substrate comprises endering the document at a resolution that is less than a resolution of the print device by:
      creating an imagemask that represents a low resolution data representation of the document content, and
      applying the watermark to the substrate through the mask so that the document contains the document content with the watermark overlaid on top.

10. The method of claim 9, wherein creating the stencil mask comprises:
    identifying a standard resolution of the print device;
    rendering the document content at a resolution that is less than the standard resolution of the print device;
    identifying a set of background pixels for the document, wherein the background pixels are pixels on which none of the document content is to be printed;
    identifying a set of content pixels for the document, wherein the content pixels are pixels on which the document content is to be printed;
    converting each of the content pixels to a single non-background color; and
    inverting the background pixels to the non-background color and the content pixels to a single background color.

11. The method of claim 9, further comprising, by the print device:
    receiving the substrate; and
    printing the document content and the modified watermark on the substrate.

12. The method of claim 9, wherein the stencil mask defines:
    a first area of the substrate on which the document content is permitted to be applied during a document generation process; and
    a second area of the substrate on which the document content is restricted from being applied during the document generation process.

13. A method of creating a secure printed document, the method comprising:
    by a processor of a document generation system:
       receiving document content for a document to be printed onto a substrate,
       creating a stencil mask comprising an image of at least a portion of the document content by:
          identifying a standard resolution of a print device of the document generation system;
          rendering the document content at a resolution that is less than the standard resolution of the print device;
          identifying a set of background pixels for the document, wherein the background pixels are pixels on which none of the document content is to be printed,
          identifying a set of content pixels for the document, wherein the content pixels are pixels on which the document content is to be printed,
          converting each of the content pixels to a single non-background color, and
          inverting the background pixels to the single non-background color and the content pixels to a single background color,
       receiving an image of a watermark to be printed on the substrate,
       generating a rule set that is configured to:
          modify the watermark to remove portions of the watermark that will correspond to locations of the stencil mask;
          cause a print device to print the document content on the substrate; and
          cause the print device to print the modified watermark through the stencil mask on the substrate; and
    by the print device, applying the rule set to print the document content and the modified watermark on the substrate;
    wherein applying the rule set to print the document content and the modified watermark on the substrate comprises rendering the document at a resolution that is less than a resolution of the print device by:
       creating an imagemask that represents a low resolution data representation of the document content, and
       applying the watermark to the substrate through the mask so that the document contains the document content.

14. The method of claim 13, wherein the stencil mask defines:
    a first area of the substrate on which the document content is permitted to be applied during a document generation process; and
    a second area of the substrate on which the document content is restricted from being applied during the document generation process.

15. A secure document creation system comprising:
    a print device;
    a processor; and
    a computer-readable medium containing programming instructions that are configured to cause the processor to:

receive document content for a document to be printed onto a substrate,
create a stencil mask comprising an image of at least a portion of the document content,
receive an image of a watermark to be printed on the substrate,
modify the watermark to remove portions of the watermark that will correspond to locations of the stencil mask,
cause the print device to print the document content on the substrate, and
cause the print device to print the modified watermark through the stencil mask on the substrate;
wherein the instructions to cause the print device to print the document content and the modified watermark on the substrate comprise instructions to render the document at a resolution that is less than a resolution of the print device by:
creating an imagemask that represents a low resolution data representation of the document content, and
applying the watermark to the substrate through the mask so that the document contains the document content with the watermark overlaid on top.

16. The system of claim 15, wherein the instructions to create the stencil mask comprise instructions to:
identify a standard resolution of the print device;
render the document content at a resolution that is less than the standard resolution of the print device;
identify a set of background pixels for the document, wherein the background pixels are pixels on which none of the document content is to be printed;
identify a set of content pixels for the document, wherein the content pixels are pixels on which the document content is to be printed;
convert each of the content pixels to a single non-background color; and
invert the background pixels to the non-background color and the content pixels to a single background color.

* * * * *